Dec. 9, 1969  A. A. MILLER  3,482,470
MULTISPEED EPICYCLIC GEARBOXES
Filed Sept. 12, 1967
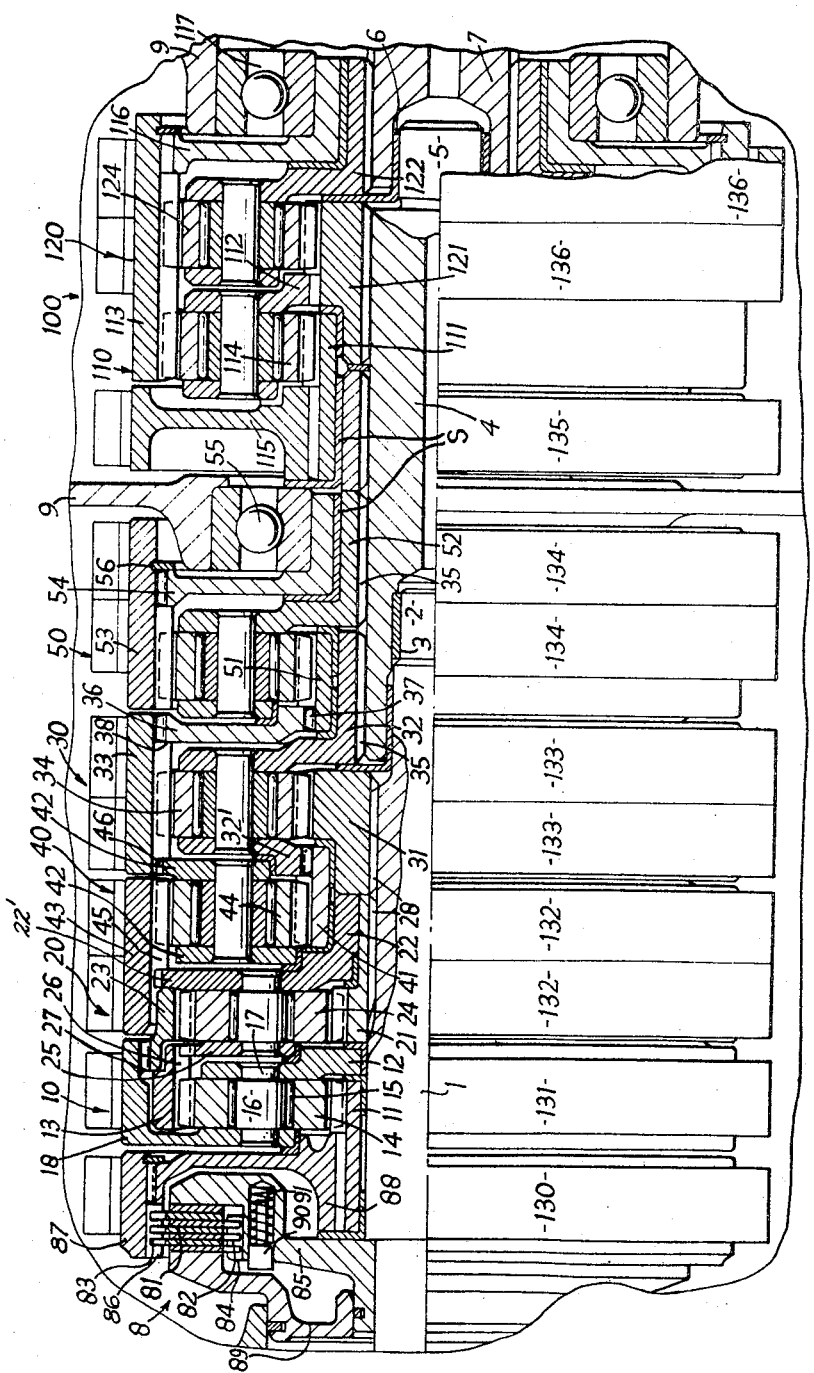

3,482,470
MULTISPEED EPICYCLIC GEARBOXES
Albert A. Miller, Esher, England, assignor to Wilson Miller and Company Limited, Middlesex, England, a British company
Filed Sept. 12, 1967, Ser. No. 667,223
Claims priority, application Great Britain, Sept. 16, 1966, 41,459/66
Int. Cl. F16h 57/10
U.S. Cl. 74—758                                                              11 Claims

ABSTRACT OF THE DISCLOSURE

A close ratio epicyclic gear transmission includes two epicyclic gear sets connected between two rotary members. One of the rotary members is connected to the planet carrier of one gear set, the planet carrier of this gear set is connected to the sun pinion of the other gear set, the planet carrier of the said other gear set is connected to the annulus of the said one gear set and the sun pinion of the said one gear set is connected to the other rotary member. By selectively arresting the annuli of the two gear sets, two ratios are obtained which are in the proportion of about 1 to 1.33. This arrangement may be incorporated in a Wilson-type transmission together, in conjunction with a two-speed transfer gear, ten closely spaced forward ratios.

---

This invention relates to multispeed epicyclic power transmissions more particularly but not exclusively of the type comprising three epicyclic gear sets, each gear set comprising a sun pinion, a group of planet pinions rotatably mounted on a planet carrier and meshing with the sun pinion, an internally toothed annulus meshing with the planet pinions and releasable holding means for the annulus, the annulus of the first set being connected to the planet carrier of the second set, the annulus of the second set being connected to the planet carrier of the first set, the planet carrier of the second set being also drivably connected to the annulus of the third set, the sun pinions of the second and third sets being connected to an input rotary member of the transmission, the planet carrier of the third set being connected to an output rotary member, the transmission including separate releasable holding means for the sun pinion of the first set. Such power transmissions are often known as "Wilson Gearboxes" and examples of such transmissions are described in British patent specification No. 164,042.

In such a transmission the lowest gear is obtained by holding stationary the annulus of the third gear set, an intermediate gear is obtained by releasing the annulus of the third gear set and holding stationary the annulus of the second gear set, thereby causing the annulus of the third set to be rotated in the forward direction, while for a higher gear the sun pinion of the first set is held stationary, thereby causing the annulus of the second gear set to be driven in the forward direction which in turn increases the forward speed of the annulus of the third gear set, thereby still further increasing the forward speed of the output rotary member.

The value of the ratio steps in existing epicyclic transmissions of the type described above is determined by practical considerations relating to the design of the epicyclic gear sets. The teeth must be of adequate size to transmit the required forces and the number of teeth in the annulus is limited by the requirement that the external diameter of the annulus should not be excessive. A minimum diameter for the sun pinion is set by the fact that a torque transmitting shaft extending through the interior of the sun pinion must be of sufficient diameter to transmit the desired torque and the hub of the sun pinion must itself be of adequate radial thickness. At the same time each planet pinion must be of sufficient diameter to contain a bearing and spindle of adequate dimensions within an adequate shell thickness for the planet pinion. In practice it is found that it is not possible to achieve satisfactorily ratio steps of much less than about 1.45:1 in existing transmissions of the type described. Moreover to achieve such values it is necessary to design each gear set to obtain the optimum results from it so that the several gear sets tend to have different proportions and dimensions for the sun pinions, planet pinions and annuli.

To suit the characteristics of modern prime movers it is desirable that a multispeed power transmission should have its lowest gear ratio not less than 2.9:1 and not more than 3.25:1 and having successive ratios in the proportions of 1:1.33±5%, together with a direct drive, thereby providing five speed ratios.

A multispeed epicyclic power transmission according to one aspect of the present invention is characterised in that the connection between the annulus of the third set and the planet carrier of the second set comprises a fourth epicyclic gear set, the annulus of the fourth set being connected to the planet carrier of the second set, the planet carrier of the fourth set being connected to the annulus of the third set and the sun pinion of the fourth set being connected to the planet carrier of the third set.

With such an arrangement, the lowest gear is obtained as before by arresting the annulus of the third gear set. The next higher gear is obtained by instead arresting the annulus of the fourth gear set. In the intermediate gear of the known power transmission, the annulus of the second gear set is arrested and its sun pinion rotates at the speed of the input rotary member. The sun pinion of the fourth gear set of the present invention however is connected not to the input rotary member but to the planet carrier of the third gear set and this planet carrier rotates in the forward direction but at a speed which is lower than that of the input rotary member. Accordingly the ratio obtained by arresting the annulus of the fourth gear set will be closer to that obtained by arresting the annulus of the third gear set than is the ratio obtained by arresting the annulus of the second gear set of the known power transmission. These closer gear ratios are obtainable while maintaining the optimum design proportions for the components of each gear set, it being preferred for reasons of maximum power capacity within a given overall diameter that the pitch circle diameter of the sun pinion should be between 35 and 50% of the pitch circle diameter of the annulus in each gear set.

The addition of the fourth gear set both provides an extra ratio and reduces the ratio step between each pair of adjacent gears.

For many purposes it is desirable to provide a multispeed transmission having a wide ratio between the lowest and highest gears, for example of the order of 13:1. Such a requirement arises for example particularly in the case of a motor vehicle which has a low power-to-weight ratio and which is to be capable of cruising at high speed on a motorway, climbing steep gradients and accelerating away from rest when fully loaded. Such an arrangement is desirable particularly for vehicles having a low power-to-weight ratio with their obvious economy of operation. At the same time it is still desirable that the ratios should be closely spaced in order that the speed of the prime mover may be maintained close to its optimum value at any speed of the vehicle. For this purpose it is convenient to employ a multispeed transmission according to the present invention and including a transfer gear between the said output member and a driven member, the said transfer gear comprising first and second transfer epicyclic gear sets, the annuli of the transfer sets being connected together, the planet carrier of the first transfer set and the sun pinion of the second transfer set being connected to the said output member, the planet carrier of the second transfer set being connected to the driven member, releasable holding means for the sun pinion of the first transfer set and releasable holding means for the annuli of the transfer sets. The transfer gear provides a low or reduction gear and a high or overdrive gear. Preferably the low gear provides a reduction ratio equal to that of the first gear in the primary portion of the transmission while the higher gear is an overdrive ratio of 1:1.33±5%.

An embodiment of the invention will now be described by way of example with reference to the accompanying drawing, in which the single figure shows in the upper half in axial section and in the lower half in elevation a multispeed epicyclic power transmission with some conventional parts omitted for the sake of clarity.

The embodiment shown in the drawing comprises an input shaft 1 formed with a spigot journal 2 which is received in a bearing 3 in an output shaft 4 on a primary portion of the power transmission. The output shaft 4 itself has a spigot journal 5 which in turn is received in a bearing 6 in a driven shaft 7.

The primary transmission connecting the input shaft 1 with the output shaft 4 consists of four forward epicyclic gear sets, a reverse epicyclic gear set and a multi-plate friction clutch 8 for establishing a direct drive between the shafts 1 and 4.

The first epicyclic gear set 10 consists of a sun pinion 11 mounted for rotation on the shaft 1, a planet carrier 12 also mounted for rotation on the shaft 1 and an internally toothed annulus 13. A set of four planet pinions 14 mesh with both the sun pinion 11 and the annulus 13 and are rotatably mounted by means of needle bearings 15 on sleeves 16 through which pass rivets 17 which extend between the planet carrier 12 on one side of the pinions 14 and a reaction member 18 on the other side of the planet pinions 14.

The second gear set 20 comprises a sun pinion 21, a planet carrier 22 rotatably mounted on the sun pinion 21 and an annulus 23. The planet carrier 22 carries a set of four planet pinions 24 which are identical to the planet pinions 14 of the first gear set and are mounted in a similar fashion with the exception that the left hand ends of the rivets lie flush in a ring 25 which carries a ring of external teeth 26 which engage with the internal teeth of the annulus 13 of the first gear set 10. Moreover, the annulus 23 of the second gear set is splined at 27 to the reaction member 18 of the first gear set and is thus connected for rotation with the planet carrier 12 of the first gear set. Thus the annulus 13 of the first gear set is connected to the planet carrier 22 of the second gear set and the annulus 23 of the second gear set is connected to a planet carrier 12 of the first gear set. The sun pinion 21 of the second gear set is splined at 28 to the input shaft 1.

The third gear set 30 is separated from the second gear set 20 by the fourth gear set 40. The third gear set 30 consists of a sun pinion 31 which is also splined to the input shaft 1 by means of a continuation of the splines 28, a planet carrier 32, an annulus 33 and a set of six planet pinions 34. The planet carrier 32 is splined at 35 to the output shaft 4. The annulus 33 is engaged by means of its teeth with an annular support 36 which in turn is engaged by means of teeth 37 with a member 51 which is rotatably mounted on the planet carrier 32. As can be seen in the drawing, the portions of the teeth of the annulus 33 which engage with the support member 36 are of reduced height so as to define a shoulder 38 against which the support member 36 abuts.

The fourth gear set 40 comprises a sun pinion 41 mounted for rotation on the sun pinion 31 of the third gear set and the planet carrier 22 of the second gear set, a planet carrier 42 carrying six planet pinions 44 and rotatably mounted on the planet carrier 22 of the second gear set and an extension 32' of the planet carrier 32 and an annulus 43 which is mounted, by means of a shoulder 45 cut into its teeth, on a toothed radial extension 22' on the planet carrier 22 of the second gear set. The planet carrier 42 has a toothed extension 46 engaged with the roots of the teeth of the annulus 33 of the third gear set the teeth of the latter forming a locating shoulder abutting against the side of the planet carrier 42.

The primary portion of the transmission also includes a reverse epicyclic gear set 50 which consists of a sun pinion formed by the member 51, a planet carrier 52 splined to the shaft 4 by an extension of the splines 35 and an annulus 53 carried by a support member 54 rotatably mounted in a ball race 55 in a portion of the housing 9 of the transmission. The support member 54 also forms a support bearing for the planet carrier 52 and thereby in turn for the shaft 4. The connection between the annulus 53 and support member 54 is similar to that between the members 33 and 36 with the addition of a circlip 56 located in a groove in the inner surface of the annulus 53.

The direct-drive multi-plate friction clutch 8 includes a set of friction plates 81 which are alternately internally and externally toothed at 82 and 83 respectively. The teeth 82 of the internally toothed friction plates are engaged with teeth 84 on a hub 85 keyed to the input shaft 1. The teeth 83 on the externally toothed clutch plates engage with internal teeth 86 in an internally toothed annulus 87 which is connected to a support member 88 in a member similar to the connection between the members 53 and 54. The inner portion of the support member 88 is splined to the sun pinion 11 of the first gear set by means of extensions of the teeth of the sun pinion 11, these extensions being of lower height so as to provide a locating shoulder. The clutch 8 is engaged by means of a piston 89 actuated by fluid pressure. To ensure that the clutch 8 disengages when the fluid pressure is released, plungers 90 are urged by springs 91 to push the piston 89 to the left to free the clutch plates 81.

The transfer gear 100 between the output shaft 4 and the driven shaft 7 consists of two transfer epicyclic gear sets 110 and 120 the proportions and dimensions of which are identical to those of the third, fourth and reverse gear sets. The gear set 110 comprises a sun pinion 111, planet carrier 112 with planet pinions 114 and an annulus 113. Splined to the sun pinion 111 by means of an extension of its teeth is a reaction member 115.

The annulus 113 is extended to form the annulus for the gear set 120 and is connected to a rotary suport member 116 in a manner similar to the connection between the members 53 and 54 and the rotary support member 116 is supported by means of a ball race 117 in the casing 9.

The gear set 120 also includes a sun pinion 121 splined to the shaft 4 by means of a further extension of the splines 35 and a planet carrier 122 which is splined to the driven shaft 7 and is rotatably suported in the support member 116. The sun pinion 121 is splined by means of an extension of its teeth to the planet carrier 112 of the gear set 110.

Each of the annuli of the gear sets with the exception of the annuli 13 and 23 together with the reaction members 18, 87 and 115 is formed with a cylindrical external braking surface to co-operate with band brakes 130 to 136. The band brakes may be of conventional design, the band brakes 132, 133, 134 and 136 being of more robust construction than the remainder of the band brakes in view of the greater reaction torques which they are required to withstand when energised to hold the transmission in the lower gear ratios.

The plain bearings between relatively rotating parts may be in the form of shells as shown at S. Alternately one of the two bearing surfaces may be metal coated for example by spraying with an appropriate material for example a bearing metal.

In operation, the lowest or first gear of the primary transmission is engaged by energising the brake band 133 acting on the annulus 33 of the third gear set. Rotation of the sun gear 31 of this gear set causes the planet pinions 34 to orbit around the interior of the stationary annulus 33 thereby imparting a forward motion of the planet carrier 32 and thereby to the shaft 4.

Second gear in the primary transmission is engaged by releasing the brake 133 and applying the brake 132 to hold the annulus 43 of the fourth gear set stationary. The sun gear 41 of the fourth gear set rotates with the output shaft 4 and planet carrier 32 of the third gear set thereby causing the planet pinions 44 of the fourth gear set to orbit around the interior of the stationary annulus 43. The resulting forward rotation of the planet carrier 42 rotates the annulus 33 in the forward direction so that the speed of the output shaft 4 is higher than in the case of first gear.

To engage the third gear of the primary portion of the transmission the brake 132 is applied and the brake 131 is applied to arrest the annulus. The planet pinions 24 orbit around the interior of the stationary annulus 23 so that the planet carrier 22 rotates in the forward direction carrying with it the annulus 43. Thus a higher gear is obtained.

To obtain fourth gear the brake 131 is released and the brake 130 is applied thereby holding stationary the sun pinion 11 of the first gear set. In order that the planet carrier 22 of the second gear set continues to rotate forwardly and carry with it the annulus 13 of the gear set, the planet carrier 12 of the gear set must rotate forwardly and this motion is transferred directly to the annulus 23 of the second gear set which was previously held stationary in third gear. Thus this forward motion is compounded on to a motion set up in third gear resulting in a higher, fourth gear.

The fifth gear of the primary portion of the transmission is obtained by releasing the brake 130 and energising the clutch 8 to lock the sun pinion 11 of the first gear set to the input shaft 1. In this way the first and second gear sets are locked and thereby the fourth and third gear sets are locked so that the input shaft 1 is locked to the output shaft 4 of the primary transmission. Since the sun pinion 11 is given a forward rotation and this is effectively compounded on to the motion in fourth gear, it will be evident that the direct drive rates a higher gear than fourth gear.

Reverse gear for the primary transmission is obtained by energising the brake 134 to hold the annulus 53 of the reverse gear set stationary. The reverse gear set then operates in conjunction with the gear set 30 in the conventional manner.

Thus the primary portion of the transmission offers a choice of five forward speeds and a reverse speed. The transfer portion 100 of the transmission offers a choice of two speed ranges giving a total ten forward speeds and two reverse speeds. When the band brake 136 is applied, the annulus 113 is held stationary so that rotation of the sun pinion 121 by the shaft 4 causes the planets 124 to orbit around the interior of the annulus 113 carrying round with them the planet carrier 122 at a speed lower than that of the shaft 4. Thus the gear set 120 superimposes a further reduction in the overall ratio of the transmission.

When the band brake 136 is released and the band brake 135 is applied, the sun pinion 111 is held stationary and the planet carrier 112 is rotated by the shaft 4. This in turn causes the annulus 113 to rotate in the forward direction with an increment of speed over that of the shaft 4. This increment of speed is reduced by the gear set 120 so that the planet gear 122 rotates at a speed lower than that of the annulus 113 but higher than that of shaft 4.

In the first and second gear sets, the sun pinions have twenty-eight teeth and the annuli seventy-six teeth. In all the other gear sets the sun pinions have thirty-nine teeth and the annuli eighty-one teeth. The clutch member 87 also has eighty-one teeth of the same dimensions. Since all the annuli are open ended at each end their toothed profiles may be very conveniently formed by a broach, only two such broaches being necessary in the manufacture of the toothed annulus members of the entire transmission. Moreover only two sizes of planet pinion are required and many other components are interchangeable for example the major portions of the planet carriers 32 and 52.

The ratios given by the transmission described above are as follows:

|  | Overall ratios from input to driven shaft | Ratio step |
|---|---|---|
| 1st speed | 3.08×3.08=9.5 |  |
| 2d speed | 2.4×3.08=7.4 | 1.28 |
| 3d speed | 1.75×3.08=5.4 | 1.37 |
| 4th speed | 1.33×3.08=4.1 | 1.32 |
| 5th speed | 1.00×3.08=3.08 | 1.33 |
| 6th speed | 3.08×1.325=2.32 | 1.33 |
| 7th speed | 2.4÷1.325=1.81 | 1.28 |
| 8th speed | 1.75÷1.325=1.32 | 1.37 |
| 9th speed | 1.33÷1.325=1.002 | 1.32 |
| 10th speed | 1.00÷1.325=0.755 | 1.33 |
| Low Reverse | −3.3∼3.08=−10.16 |  |
| High Reverse | −3.3÷1.325=−2.49 |  |

It will be noted that the third and fourth gear sets 30 and 40 provide a two speed transmission between the input shaft 1 and the planet carrier 32 of the third gear set, the two alternative ratios being close together, in the ratio 1.28:1. Thus in accordance with the broadest aspect of the present invention there is provided a multispeed epicyclic power transmission comprising at least two epicyclic gear sets, each gear set comprising a sun pinion, a group of planet pinions rotatably mounted on a planet carrier and meshing with the sun pinions, an internally toothed annulus meshing with the planet pinions and releasable holding means for the annulus, the transmission interconnecting two rotary members, wherein one of the rotary members is connected to the planet carrier of one of the epicyclic gear sets, the planet carrier of the said one gear set being connected to the sun pinion of the other gear set, the planet carrier of the said other gear set is connected to the annulus of the said one gear set and the sun pinion of the said one gear set is connected to the other rotary member.

Among other advantages, the two gear sets in such an arrangement may have the same dimensions and numbers for the teeth in the annuli, planet pinions and sun pinions respectively. If a three speed close-ratio transmission is required the second gear set 20 may be included, its planet carrier being connected to the annulus of the said other gear set and its sun pinion being connected to the said other rotary member.

I claim:

1. A multispeed epicyclic power transmission of the of the type comprising at least three epicyclic gear sets, each gear set comprising a sun pinion, a group of planet pinions rotatably mounted on a planet carrier and meshing with the sun pinion, an internally toothed annulus meshing with the planet pinions and releasable holding means for the annulus, the annulus of the first set being connected to the planet carrier of the second set, the annulus of the second set being connected to the planet carrier of the first set, the planet carrier of the second set being also drivably connected to the annulus of the third set, the sun pinions of the second and third sets being connected to an input rotary member of the transmission, the planet carrier of the third set being connected to an output rotary member, the transmission including separate releasable holding means for the sun pinion of the first set, characterized in that the connection between the annulus of the third set and the planet carrier of the second set comprises fourth epicyclic gear set, the said fourth gear set comprising a sun pinion, a group of planet pinions rotatably mounted on a planet carrier and meshing with the sun pinion, an internally toothed annulus meshing with the planet pinions and releasable holding means for the annulus, the annulus of the fourth set being connected to the planet carrier of the second set, the planet carrier of the fourth set being connected to the annulus of the third set and the sun pinion of the fourth set being connected to the planet carrier of the third set.

2. A power transmission according to claim 1, and including a reverse epicyclic gear set, the sun pinion of the reverse gear set being connected to the annulus of the third gear set, the planet carrier of the reverse gear set being connected to the output member, the reverse gear being engageable by applying releasable holding means to the annulus of the reverse gear set.

3. A power transmission according to claim 2, wherein all the gear sets with the exception of the first and second are similar in that the annuli, planet pinions and sun pinions have the same gear tooth form and numbers of teeth.

4. A power transmission according to claim 1, and including a transfer gear between the said output member and a driven member, the said transfer gear comprising first and second transfer epicyclic gear sets, the annuli of the transfer sets being connected together, the planet carrier of the first transfer set and the sun pinion of the second transfer set being connected to the said output member, the planet carrier of the second transfer set being connected to the said driven member, releasable holding means for the sun pinion of the first transfer set and releasable holding means for the annuli of the transfer sets.

5. A power transmission according to claim 1, wherein the third and fourth sets are similar in that the annuli, planet pinions and sun pinions have the same gear tooth form and numbers of teeth.

6. A power transmission according to claim 5, and including a multi-plate friction clutch for establishing a direct drive through the said four epicyclic gear sets, the clutch being connected between the input rotary member and the sun pinion of the first gear set, the plates of the clutch being splined alternately to the input member and to a member connected to the sun pinion of the first gear set, those clutch plates which are splined to the said member having an external tooth form corresponding to the tooth form of the annuli of the gear sets other than the first and second.

7. A power transmission according to claim 1, wherein the annulus of at least one set is formed by an open ended member of the inner surface of which does not project inwardly beyond the profile of the gear teeth, and the supporting member for the annulus has a corresponding externally toothed portion to engage with the said annulus.

8. A power transmission according to claim 7, wherein the portion of the annulus which engages with the said externally toothed portion has the inwardly projecting tip portions of the teeth cut away to form a laterally-locating shoulder which abuts a shoulder on the projecting portion of the supporting member, the base circle of the teeth on the projecting portion being a greater diameter than the tip circle diameter of the remainder of the teeth portion of the annulus.

9. A power transmission according to claim 1, wherein the pitch circle diameter of the sun pinions is between 35 and 50 percent of the pitch circle diameter of the corresponding annuli.

10. A power transmission according to claim 1 and including a friction clutch for establishing a direct drive through the said four epicyclic gear sets, the friction clutch being connected between the input rotary member and the sun pinion of the first gear set.

11. A multispeed epicyclic power transmission comprising at least three epicyclic gear sets, each gear set comprising a sun pinion, a group of planet pinions rotatably mounted on a planet carrier and meshing with the sun pinion, an internally toothed annulus meshing with the planet pinions and releasable holding means for the annulus, the transmission interconnecting two rotary members, wherein one of the rotary members is connected to the planet carrier of one of the epicyclic gear sets, the planet carrier of the said one gear set is connected to the sun pinion of another of the gear sets, the planet carrier of the said another gear set is connected to the annulus of the said one gear set, the sun pinion of the said one gear set is connected to the other rotary member, the planet carrier of a further gear set is connected to the annulus of the said other gear set, and the sun pinion of said further gear set is connected to the said other rotary member.

References Cited

UNITED STATES PATENTS

| | | | |
|---|---|---|---|
| 2,251,625 | 8/1944 | Hale | 74—764 X |
| 2,612,792 | 10/1952 | Wilson et al. | 74—759 |
| 2,838,960 | 6/1958 | Simpson | 74—759 |
| 2,929,272 | 3/1960 | Miller | 74—759 |

FOREIGN PATENTS 642,054   8/1950   Great Britain.

DONLEY J. STOCKING, Primary Examiner

T. C. PERRY, Assistant Examiner

U.S. Cl. X.R.

74—765